United States Patent [19]
Takemoto et al.

[11] Patent Number: 5,605,329
[45] Date of Patent: Feb. 25, 1997

[54] METAL BODY DETECTING APPARATUS FOR DETECTING LOCATION OF METAL BODY AND A SENSING MATRIX ASSEMBLY USED THEREFOR

[75] Inventors: Takatoshi Takemoto; Kazunari Kawashima, both of Tokyo; Shigeru Handa, Hachioji, all of Japan

[73] Assignee: Kabushiki Kaisha Ace Denken, Tokyo, Japan

[21] Appl. No.: 307,783

[22] PCT Filed: Apr. 16, 1993

[86] PCT No.: PCT/JP93/00490

§ 371 Date: Dec. 1, 1994

§ 102(e) Date: Dec. 1, 1994

[87] PCT Pub. No.: WO93/21494

PCT Pub. Date: Oct. 28, 1993

[30] Foreign Application Priority Data

Apr. 16, 1992 [JP] Japan ......................... 4-96800

[51] Int. Cl.⁶ ........................................................ A63F 7/02
[52] U.S. Cl. ................................. 273/121 B; 273/121 A
[58] Field of Search ........................ 273/118 R, 118 A, 273/119 R, 112 A, 121 A, 121 B, 237, 238, 239; 324/219, 207.17, 207.11; 463/25

[56] References Cited

FOREIGN PATENT DOCUMENTS

| | | |
|---|---|---|
| 63-26720 | 2/1988 | Japan . |
| 2-279186 | 11/1990 | Japan . |
| 4002378 | 1/1992 | Japan .................. 273/121 B |
| 4-122375 | 4/1992 | Japan . |
| 2230463 | 10/1990 | United Kingdom ............ 273/121 B |

*Primary Examiner*—Jessica Harrison
*Assistant Examiner*—Michael O'Neill
*Attorney, Agent, or Firm*—Lowe, Price, LeBlanc & Becker

[57] ABSTRACT

A metal body detecting device having a sensing matrix (20) and a signal processing system (170) for driving the sensing matrix. The sensing matrix comprises a plurality of transmission lines (22) and a plurality of reception lines (26) arranged in rows and column respectively, and a wiring board (17) for supporting these lines. Each of the transmission lines and reception lines consists of a pair of lead wires formed of an outward path and a return path being in parallel each other. The pair of lead wires is connected at one end, and are used, at the other end, as an input and an output end of a signal. The wiring board includes a transmission terminal unit (23) and a reception terminal unit (27) and an area on which the transmission lines and the reception lines are wired. The wiring board further includes circumventive wiring (64) for transmission lines for connecting the input/output end of the transmission lines to the transmission terminal unit, and circumventive wiring for reception lines for connecting the input/output end of the reception lines. At least one of the circumventive wiring for transmission and the circumventive wiring for reception, is provided with individual wiring for only one of the input/output end of the outward path and return path of each pair of lead wires, and common wiring is provided for the other end.

13 Claims, 16 Drawing Sheets

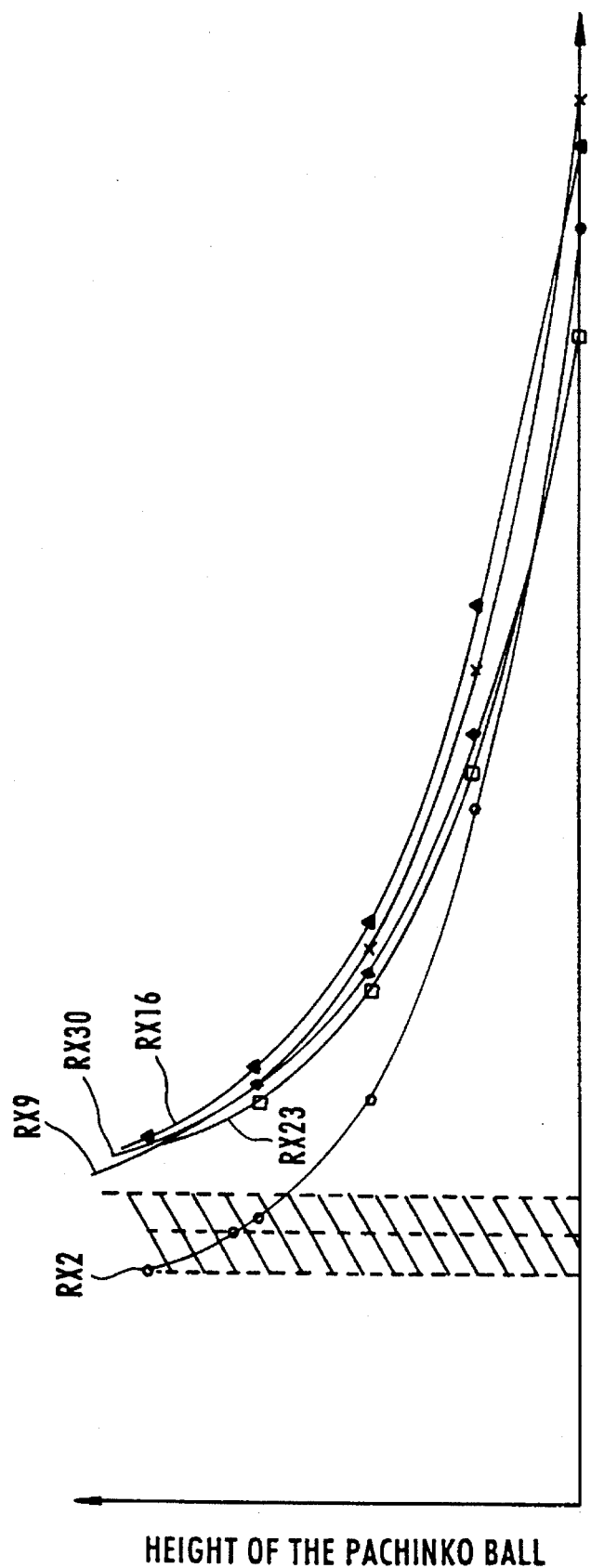

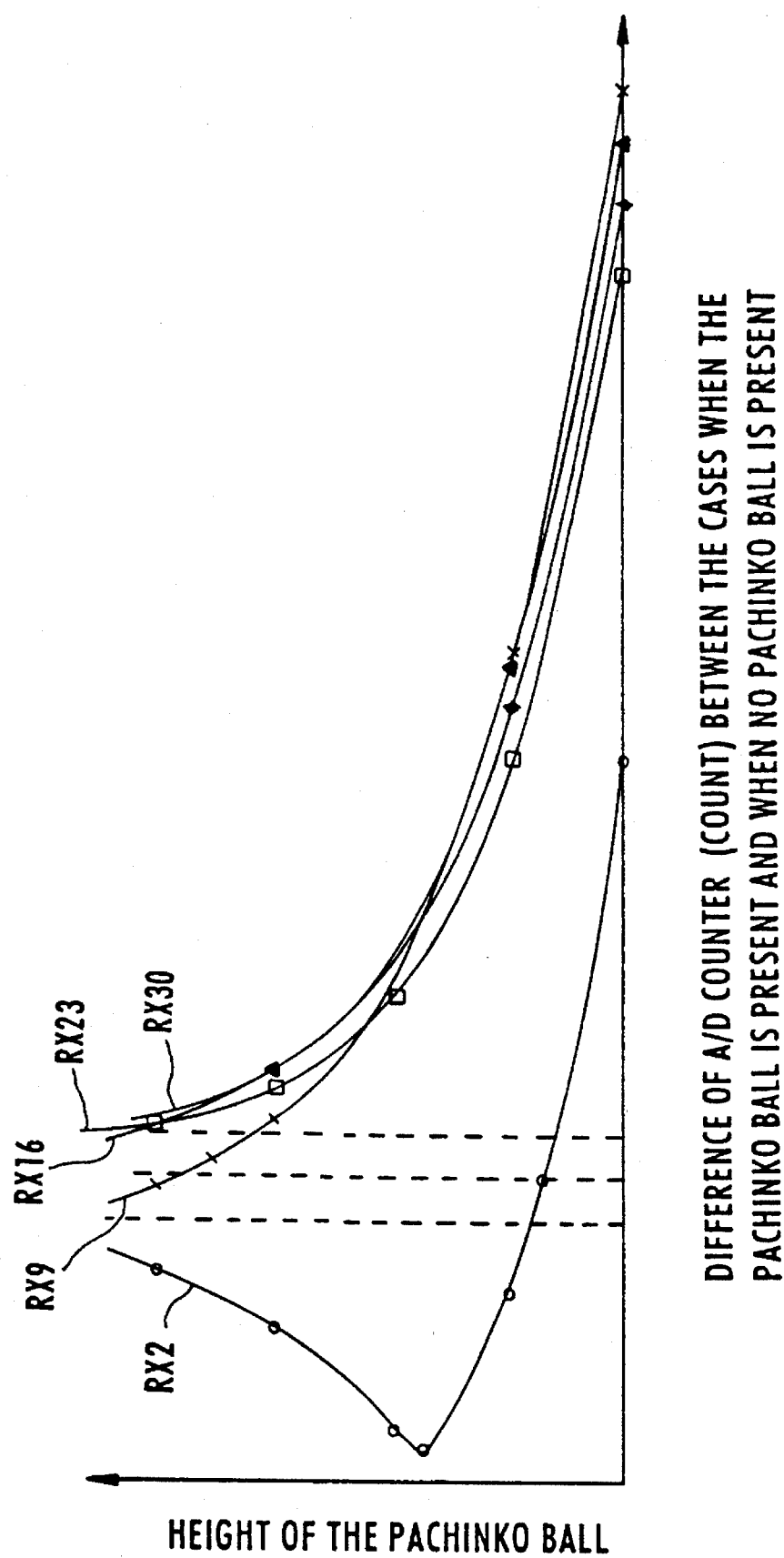

METAL BODY DETECTING APPARATUS FOR DETECTING LOCATION OF METAL BODY AND A SENSING MATRIX ASSEMBLY USED THEREFOR

FIELD OF THE INVENTION

The present invention relates to a sensor, and a metal body detecting apparatus employing the sensor for detecting the position of a metal body and a sensing matrix assembly, and more particularly to a sensing matrix assembly formed of a plurality of transmission lines and a plurality of reception lines so as to arrange detecting points in a matrix, and a metal body detecting apparatus for detecting the presence of a metal body and the location thereof by employing the sensing matrix.

DESCRIPTION OF THE RELATED ART

In some cases it is necessary to detect the location of a metal body in a predetermined region, especially within a plane region. By way of an example of such cases, the movement course of a metal body in the plane region may be detected. In other cases, when metal bodies are distributed within a region, a distribution pattern of the metal bodies may be detected. As an example of the former cases, the movement course of a game playing medium in a game machine may be detected.

Some of the game machines are such that a metal body, for example, a metal ball, is moved within a specified space which has been provided in the game machine, and that the prize is determined according to the reached position of the ball. A typical example of such a game machine is a pachinko game machine with which a game player lets a metal pachinko ball move and fall down within a space with many obstacles, the space being formed between parallel planes.

In general, the pachinko game machine has a panel which defines the space within which the pachinko ball moves, a glass plate which covers the panel at a fixed interval therefrom, and a projectile mechanism which projects pachinko balls into the space formed between the panel and the glass plate. The pachinko game machine is installed in such a manner that the panel may be substantially in parallel to the vertical direction. The panel is provided with a plurality of winning holes, and a discharge hole. When the pachinko ball enters the winning hole, that is a win for the player, while all the pachinko balls which fail to enter the winning holes are finally gathered to be discharged from the discharge hole.

Besides, a number of pins (nails) having a length almost equal to the diameter of pachinko balls, are provided at the panel, projecting therefrom and substantially perpendicular to the panel, so that the projected pachinko balls may frequently collide against the pins when falling along the panel to have their moving direction altered. The distribution of the pins is predetermined and pins are arranged accordingly, so that pins may alter the moving direction of the pachinko ball, in some cases guiding the pachinko ball to move toward the winning hole, and in other cases guiding the pachinko ball to miss the winning hole.

By the way, in a pachinko parlor where a plurality of such pachinko machines are installed, the winning status of each one of the pachinko game machines has to be controlled. Namely, it is necessary to find pachinko game machines where pachinko balls move unevenly, or unusually, because such machines require replacements or repairing. It is also necessary to detect an illegal act being perpetrated by a game player during the game, such as guiding the pachinko ball into the winning hole by using a magnet or the like.

A metal body detecting apparatus for such purposes, is disclosed in Japanese patent Application publication (kokai) No. Hei2-279186.

In this publication, a pachinko ball detecting apparatus is disclosed. The detecting apparatus comprises, a metal sensor, which is a so called detecting matrix which consists of a transmission coil line group and a reception coil line group. In the transmission coil column group, a plurality of transmission coil lines in which a series of transmission units of open ring configuration are disposed, are arranged in one direction. In the group of reception coils, lines of reception coils, in which a series of reception units of open ring configuration are disposed, are arranged in a direction crossing the transmission coil line group to cause an induction coupling with the respective transmission units. The metal sensor is then connected to a control apparatus, and driven thereby to detect whether any metal body is present or not at each portion where the transmission unit and the reception unit overlap each other.

The metal sensor is fixed to a glass plate which covers the panel of the pachinko game machine, so that the position of the pachinko ball on the panel of the pachinko game machine can be detected.

In order to increase the degree of accuracy of detection for this metal sensor, it is necessary to provide a greater number of transmission coil rows and reception coil colums. However, due to the open ring configuration of the coils, the structure is complicated and the wiring density cannot be increased.

On the other hand, in the specification of Japanese Patent Application (Japanese Patent Application Hei2-244898, Publication (Kokai) Hei4-122375, published on Apr. 22, 1992: (The publication is after the priority date of the present application. It will not be a prior art for the present invention.), the same applicants as that of the present invention suggested the use of transmission lines and reception lines instead of coil rows to construct a sensor. Namely, there is disclosed a detecting matrix, where a plurality of transmission lines, each having a folded portion are fixed to one surface of a wiring board in parallel to each other, and a plurality of reception lines, having a folded portion, are fixed to the opposite surface of the wiring board in parallel to each other in such a manner that these reception lines may cross the transmission lines so that the reception lines may electromagnetically couple with the respective transmission lines. In the detecting matrix, the transmission lines and the reception lines are respectively connected to the corresponding transmission circuit and reception circuit of the control apparatus. A signal current is fed successively to each transmission line, to obtain an induction current induced by the signal current successively for each reception line. Based on the induction current received by the reception circuit, it is detected whether a metal body is present or not. At the same time, the position of the metal body can be detected from the combination of a transmission line through which the signal current is flowing and the reception line which is receiving the induction current.

In order to increase the accuracy of detection, it is necessary to provide a large number of transmission lines and reception lines. It is also necessary that the transmission lines be connected to the transmission circuit, and the reception lines be connected to the reception circuit, respectively.

In the conventional manner of connection, a transmission terminal unit having a number of terminal pairs equivalent to the number of transmission lines for both an outward path and a return path, and a reception terminal unit similarly having a number of terminal pairs equivalent to the number of reception lines for both an outward path and a return path are provided at the end portion of the wiring board. The input/output end of each of the transmission lines and the reception lines is connected to the corresponding transmission terminal unit and the reception terminal unit, respectively, through circumventive wiring. A connector having a number of pins equal to the number of lines connected thereto is provided at the transmission terminal unit and the reception terminal unit. The transmission circuit and the reception circuit are connected by a connector and a cable.

With this construction, when a large number of transmission lines and reception lines are provided, the number of lines constituting the circumventive wiring and the pins for the connector, become extremely large. For example, if 32 transmission lines are provided, the number of lines for constituting the circumventive wiring for the transmission side will be 64. Therefore, a larger area is required for plane wiring of these lines. Additionally, as the terminal unit has to be large too, it becomes an obstacle for reducing the size of the detecting apparatus. To solve this problem, the line width of the circumventive wiring, and the width of the terminal in the terminal unit may be reduced. However, in such a structure, the wiring resistance would increase, and therefore the amount of signal current would be restricted, accordingly the increase of the amount of transmission current to improve the detecting accuracy (noise resistance) may be limited. Accordingly the detecting accuracy cannot be improved.

DISCLOSURE OF THE INVENTION

It is an object of the present invention to provide a sensing matrix assembly for detecting the position of a metal body, and a metal body detection apparatus employing the sensing matrix assembly, which can realize downsizing thereof and can further improve the detecting accuracy while reducing the number of lines required for circumventive wiring connecting the transmission circuit and reception circuit to the corresponding transmission lines and reception lines respectively.

To accomplish the aforementioned object, according to an embodiment of the present invention, there is provided a sensing matrix assembly having a planar detecting area. According to another embodiment, there is provided the sensing matrix assembly, and a metal body detecting apparatus having a signal processing system in which the presence of a metal body and the position thereof are detected by driving the sensing matrix.

The sensing matrix assembly comprises a plurality of transmission lines and a plurality of reception lines and a wiring board for supporting the lines. The transmission lines and the reception lines, each having a pair of lead wires formed of an outward path and a return path being parallel with each other. The outward path and the return path in each pair of wires are connected with each other at one end thereof, and the other end portions are adapted so as to be an input and an output end of a signal. In other words, each of the lead wires has a folded configuration in an electrical sense. The plurality of transmission lines and the plurality of transmission lines are arranged crossing each other. Specifically, each of the transmission lines are placed in the column direction with a predetermined interval therebetween, and the reception lines are placed in the row direction, also with a predetermined interval therebetween. Due to the placement of each transmission line and each reception line, the crossing portions thereof are arranged in a matrix on the wiring board.

The signal processing system comprises a transmission circuit for successively scanning each of the transmission lines to send a transmission signal thereto, a reception circuit for successively scanning each of the reception lines to obtain a reception signal applied thereto, and a signal processing device for determining whether a metal body is present or not based on the obtained signal through the reception circuit, and for determining the location where the metal body is detected, based on information indicative of the transmission line scanning position in the transmission circuit, and information indicative of the reception line scanning position in the reception circuit. Incidentally, by storing information indicative of the location of the pachinko machines in the information processing device with respect to time, the movement course of the pachinko ball can be detected.

The wiring board comprises a transmission terminal unit for connecting to the transmission circuit, a reception terminal unit for connecting to the reception circuit, a wiring area on which the transmission lines and the reception lines are to be arranged, and circumventive wiring for transmission lines for connecting the input/output ends of the transmission lines to the transmission terminal unit, and circumventive wiring for reception lines for connecting the input/output ends of the reception lines to the reception terminal unit, both the circumventive wiring for transmission lines and the circumventive wiring for reception lines being provided out of the wiring area.

At least either one of the circumventive wiring for the transmission lines or the circumventive wiring for the reception lines being provided with individual wiring, with respect to only one input/output end of the outward path and the return path in each pair of wirings, and the other end being provided with common wiring.

In the sensing matrix according to the present invention, the number of lines in the circumventive portion for connecting the transmission lines to the transmission terminal unit, and the reception lines to the reception terminal unit, is reduced by half compared to the prior type. Therefore if the conventional line width is maintained in the circumventive portion, the wiring area of the circumventive portion may be greatly reduced to realize downsizing of the sensing matrix or the production cost may be reduced.

Even when the wiring area of the circumventive portion is maintained or only just slightly reduced, the line width in the circumventive portion can be increased remarkably. Therefore the amount of transmission current can be increased to improve the detection sensitivity (noise resistance).

BRIEF DESCRIPTION OF THE DRAWINGS

FIG. 15 is a graph showing the performance data of the sensing matrix according to the present invention.

FIG. 16 is a graph showing the performance data of a sensing matrix which does not have the feature of the sensing matrix according to the present invention.

DESCRIPTION OF THE PREFERRED EMBODIMENT

Figure 1:
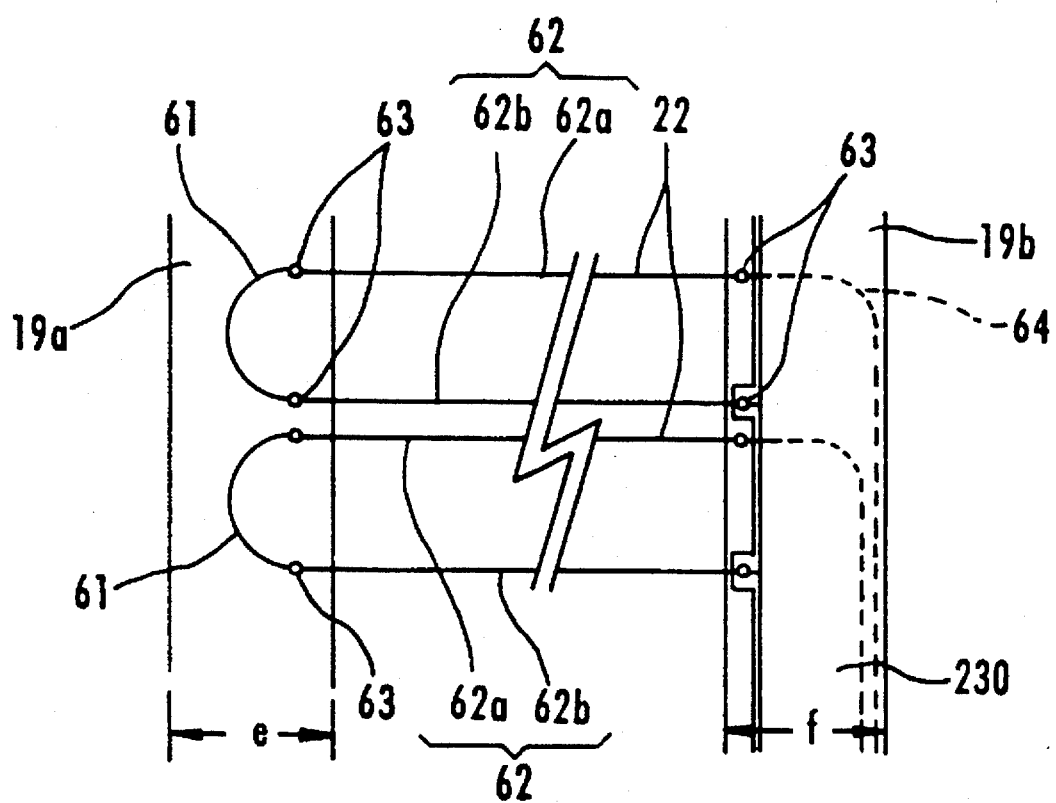
FIGS. 1 is a front view showing the transmission lines and their circumventive portion.

The first embodiment of the present invention will now be explained, referring to the drawings.

Preceding the description of the first embodiment, a pachinko game machine, to which the embodiment of the present invention is applied, will be explained referring to FIG. 6.

Figure 6:
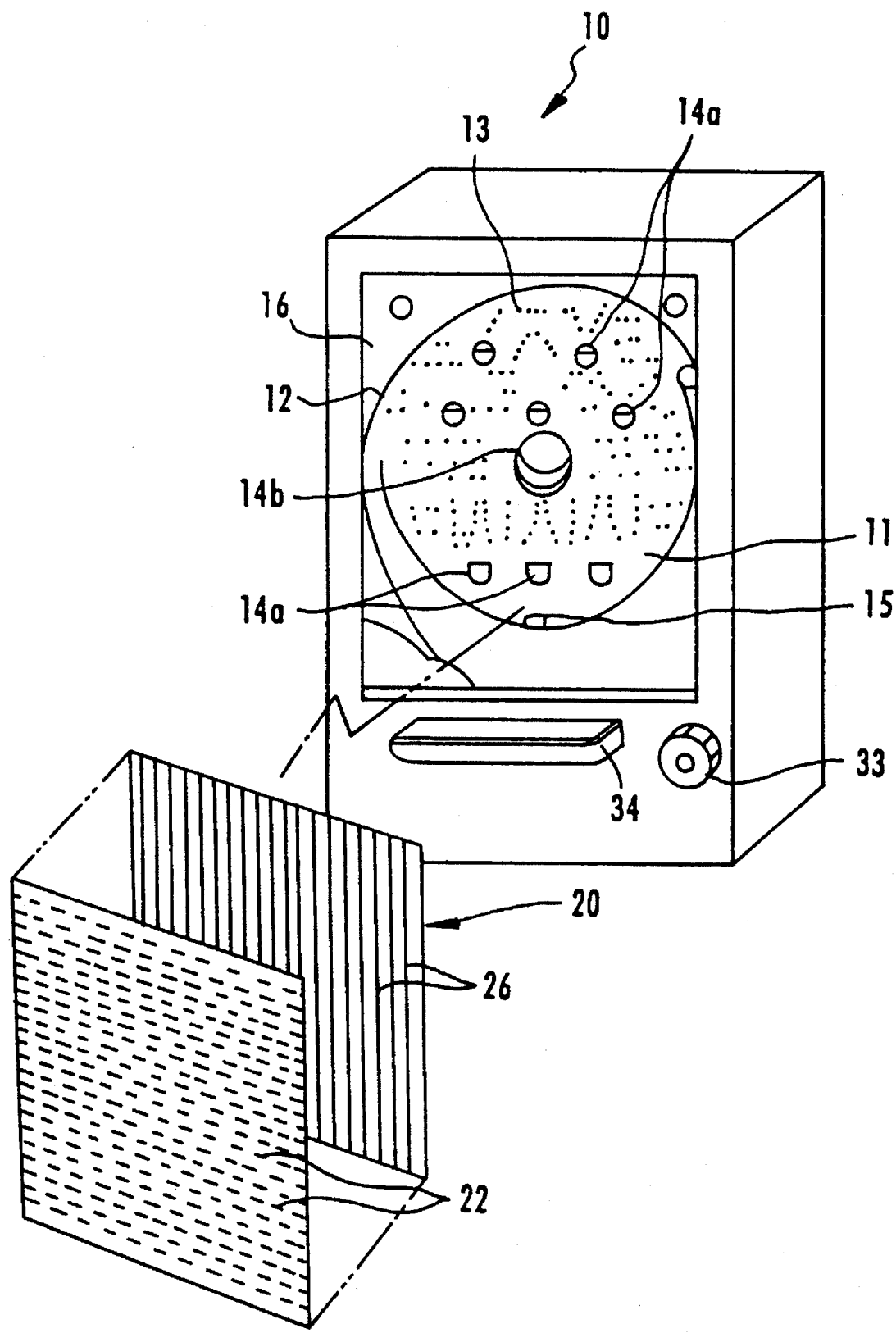
FIG. 6 is a perspective view showing the pachinko game machine and the sensing matrix conceptually disassembled.

As shown in FIG. 6, the pachinko game machine includes a panel 11 which defines a space for moving a pachinko ball in cooperation with a front glass element 16 which covers the panel 11 with a fixed interval held therebetween, and a projectile mechanism which serves to project the metal ball into the space defined between the panel 11 and the glass element 16. The pachinko game machine is so installed that the panel 11 is substantially in parallel to the vertical direction.

A guide rail 12 is mounted to the panel 11. The domain inside the guide rail 12 is the game region. The guide rail 12 guides the pachinko ball projected by the projectile mechanism to the upper part of the game region in the vertical direction (upstream portion) therealong.

In this game region, there are provided a plurality of winning holes 14a, which are for awarding a win when the pachinko ball enters therein. The ball which enters the winning hole is discharged out from the panel 11 therefrom. There are also provided, in the center of the panel at a protion intermiediate between the upstream and the downstream, a prize winning device 14b for realizing a special wining status, and a discharge hole 15 to collect all the pachinko balls which have failed to enter any of the winning holes 14a for discharging them from the panel 11. The prize wining device 14b is a device which changes its status every time a pachinko ball enters the specific winning holes 14a, and discharges a large number of pachinko balls as a prize only when a certain condition is met. By way of an example, rotating drums similar to that of a slot machine may be mounted. The drums are rotated each time a win occurs, and if all the symbols positioned at front agree with a predetermined symbol, this brings a special wining status, and a large number of pachinko balls are discharged.

Figure 7:
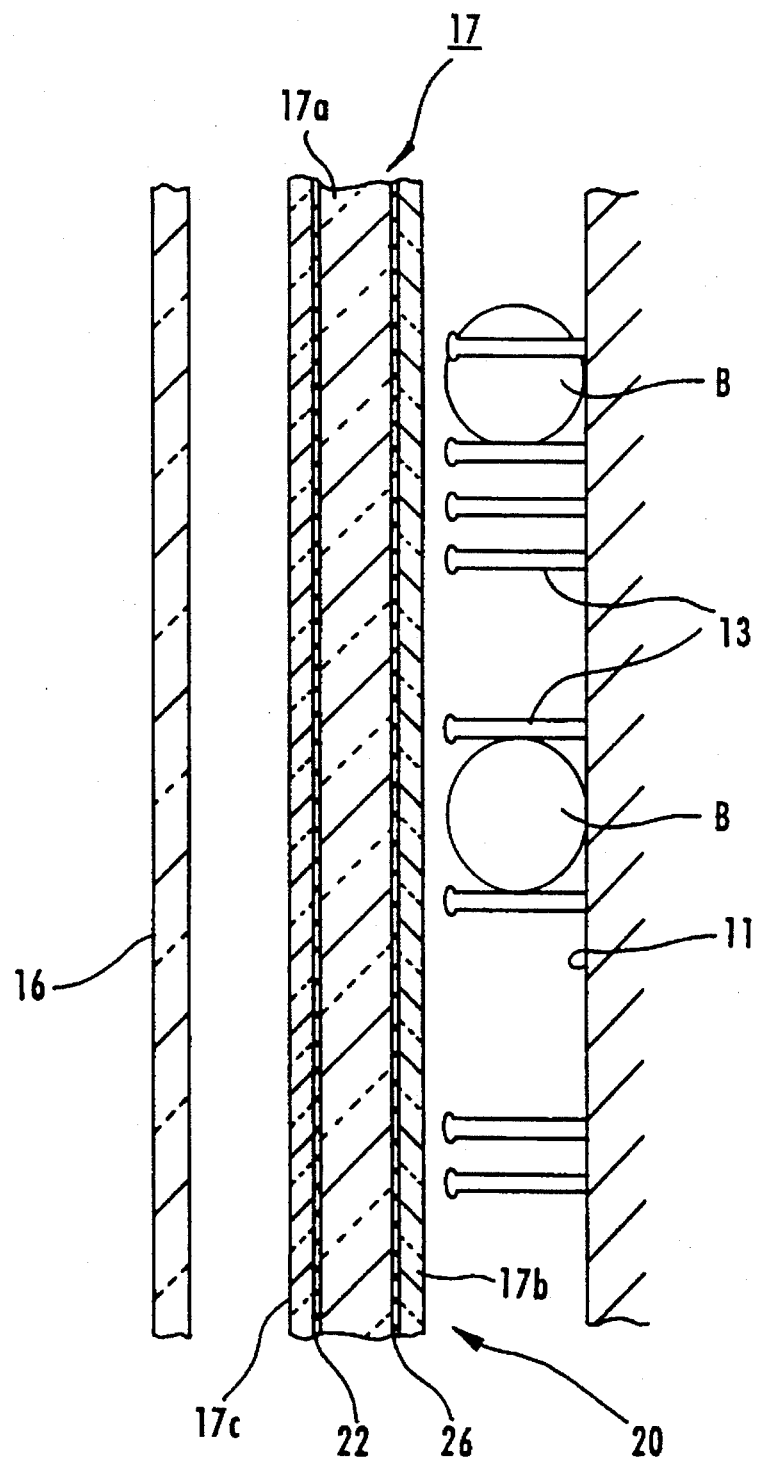
FIG. 7 is a cross sectional side view of the panel of the pachinko game machine.

As shown in FIG. 7, a large number of pins (nails) 13 are erected to be substantially perpendicular to the panel 11 in such a way that each pin protrudes from the panel 11 by a length corresponding to the diameter of the pachinko ball B, so that the projected pachinko ball B falling along the panel 11 may frequently collide against the large number of pins 13, thereby having its moving direction changed. These pins 13 are distributed over the panel 11 for the purpose as mentioned before.

In the front side of the pachinko game machine 10, there are provided a projectile handle 33 for projecting the pachinko balls, and a reception plate 34 for receiving the pachinko balls which are discharged as a prize. The projectile handle 33 is a part of the projectile mechanism as mentioned above.

As shown in FIG. 7, the front glass which covers the panel 11 is provided along the panel 11 of the pachinko game machine 10 and has a double structure of a front glass element 16 and an inner glass assembly 17. The inner glass assembly 17 is formed of a glass base 17a, and surface glass elements 17b and 17c bonded to opposite surfaces of the glass base respectively.

Next, an embodiment of a metal body detecting apparatus according to the present invention is explained referring to drawings.

Figure 9:
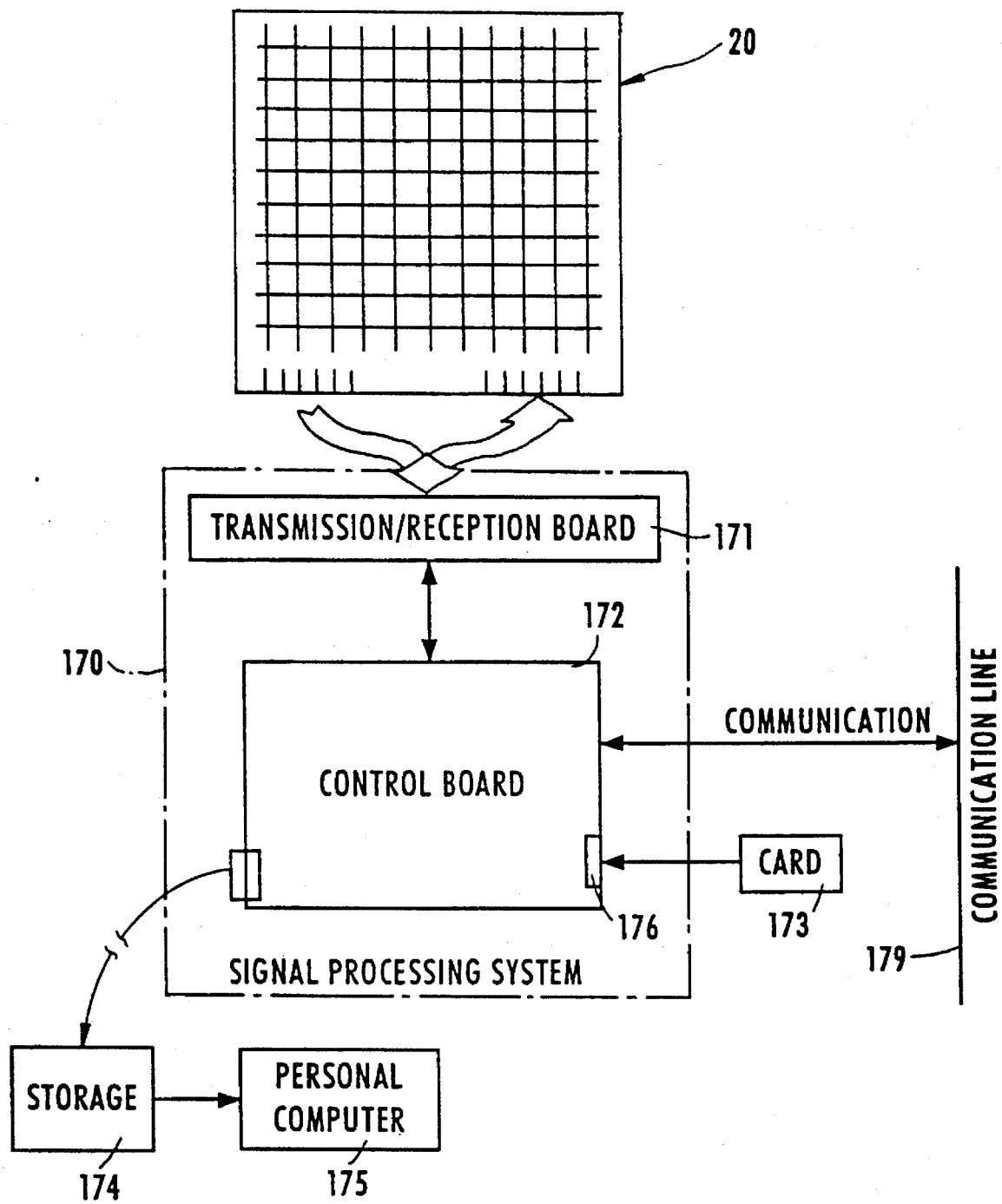
FIG. 9 is a diagrammatic configuration of the sensing matrix.

As shown in FIG. 9, the metal body detecting apparatus according to the embodiment of the present invention, has a detecting region extending in a plane, a sensing matrix 20 which works as a metal sensor, a signal processing system 170 for detecting the presence of a metal body and location thereof by driving the sensing matrix 20.

Figure 8:
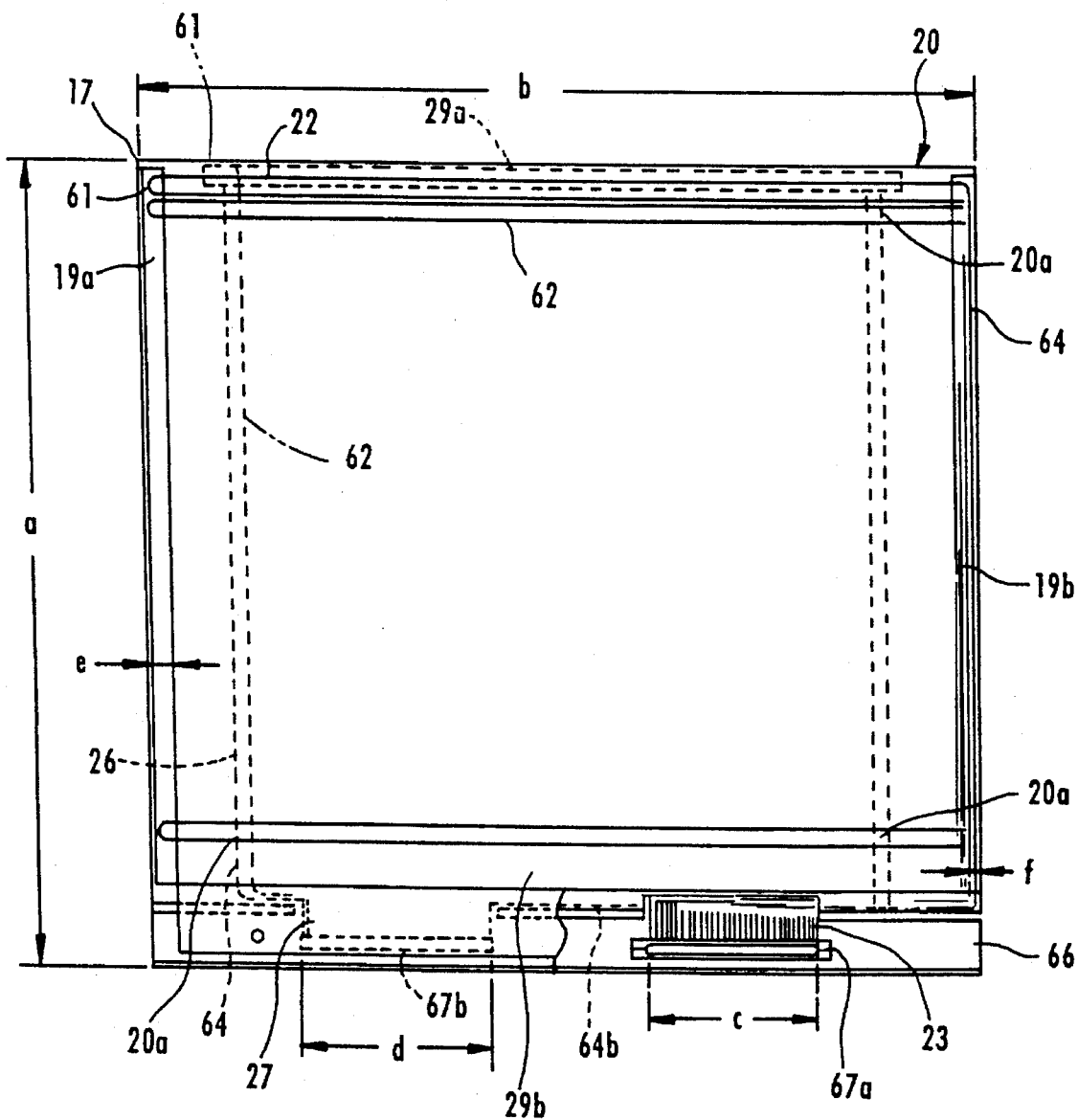
FIG. 8 is a front view showing the sensing matrix.

As shown in FIG. 8, the sensing matrix 20 includes a plurality of transmission lines 22, and a plurality of reception lines 26 and a wiring board for supporting these lines. As shown in FIG. 1, the transmission line 22 is formed of a pair of lead wires 62, respectively forming an outward path 62a and a return path 62b in parallel to each other. Not illustrated in a figure, the reception line is formed of a pair of lead wires 62 in the same manner. In this embodiment, the lead wire 62 is formed, for example, of an copper wire with an insulation coating of polyurethane. The outward path and the return path of the pair of lead wires 62 are connected at one end side, and the other end side is used for an input/output end of a signal respectively.

The transmission lines 22 and the reception lines 26 are arranged crossing each other. To be more concrete, the transmission lines 22 are disposed in a column direction with a predetermined interval therebetween, while the reception lines 26 are disposed in a row direction with a predetermined interval therebetween. By the arrangement of the transmission lines 22 and reception lines 26, crossing portions of the transmission lines 22 and the reception lines 26, which form the detecting areas, are arranged in a matrix. The the column and row directions are arbitrary and either direction could be the column, or the row.

The signal processing system 107 includes a transmission/reception board 171 which serves as a transmission/reception means for driving the sensing matrix 20, and a control board 172 which controls the transmission/reception board 171 to receive the detection signal for determining the presence of a metal body based on the received signal, and which functions as signal processing means for processing the detection of the location where the metal body is detected.

The transmission/reception board 171, as will be mentioned later, includes a transmission circuit 40 (see FIG. 10)

which scans the transmission lines 22 successively to send a transmission signal to the respective transmission lines, and a reception circuit 50 (see FIG. 12) which scans the reception lines 26 successively to accept a reception signal from respective reception lines. The control board 172 determines the presence of a metal body based on the signal received from the reception circuit 50, and further detects the location where the metal is detected based on the both information indicative of the scanning location of the transmission line in the transmission circuit 40, and information indicative of the scanning location of the reception line in the reception circuit. The control board is further capable of obtaining the moving course of a pachinko ball by storing information indicative of the location of the pachinko ball with respect to time, from the moving course of the pachinko ball, the characteristics of the pachinko game machine can be known, and an unusual movement can be detected to determine whether an illegal act was perpetrated or not.

Next, the sensing matrix will be further explained in detail.

As shown in FIG. 7, the sensing matrix is formed planar at the inner one of the two glass elements covering the panel 11, namely, on the inner glass assembly 17. Accordingly it is formed between the front glass element 16 and the panel 11.

As shown in FIG. 8, in the sensing matrix 20, a plurality of transmission lines 22 are arranged in parallel to each other in one direction, and provided on one of the faces of the glass base 17a (front side face) of the inner glass assembly 17. Each of the transmission lines is folded in parallel to each other making a U-turn at the end portion of the glass base 17a and is fixed to the glass base 17a.

In the same manner, the plurality of reception lines are arranged in parallel to each other in one direction and provided on the other face of the glass base 17a (the panel 11 side face) of the inner glass assembly 17. Each of the reception lines is folded in parallel to each other making a U-turn at the end portion of the glass base 17a, and is fixed to the glass base 17a. A transmission terminal unit 23 and a reception terminal unit 27, which operates as a connecting portion for these transmission lines 22 and the reception lines 26, are concentratedly provided at the lower portion of the inner glass assembly 17 in a vertical direction, when they are fixed to the pachinko game machine.

Each of the reception lines is wired in such a manner that reception lines 26 may make a magnetic coupling with the respective transmission lines 22. Namely, they are arranged in a parallel plane with respect to that of the transmission lines and in a direction perpendicularly crossing the transmission lines so as to allow an interlinkage with the magnetic flux of each of the transmission lines. The planar sensing matrix 20 is formed of the transmission lines 22, and the reception lines 26, having a inner glass assembly 17 as their base.

As shown in FIG. 8, square portions (detection positions) which are enclosed by the transmission lines 22 and the reception lines 26 crossing each other, form detecting units 20a, 20a for sensing a metal body, which is, in the present embodiment, a pachinko ball.

The inner glass assembly 17 is a rectangular glass base having a length a of 367 mm ±10 mm, and a width b of 367±10 mm and a thickness of 3.0–3.5 mm. The front glass 17b, 17c is shorter than 17a, and therefore the lower end of the glass base 17a is exposed.

On the inner glass assembly 17, the transmission line 22 is bonded to one face of the glass base 17a through a transparent adhesive layer, and the front glass 17c is placed over the transparent adhesive layer covering the inner glass assembly 17. The inner glass assembly 17 has the reception lines 26 on the other face of the glass base 17a bonded through a transparent adhesive layer, and the front glass 17b is disposed thereon covering the reception lines through the transparent adhesive layer.

As shown in FIG. 8, on one face of the glass base 17a, a folding base 19a is provided at the left end portion thereof, and an L-shaped circumventive base 19b for transmission side is provided at the right end portion thereof. On the other face of the glass base 17a, a folding base 29a is provided at the upper end portion thereof, and a circumventive base 29b is provided at the lower end portion thereof.

As shown in FIGS. 1 and 8, a transmission line 22 consists of a folded portion 61 formed on the folding base 19b, wires 62a, 63b connected to the folded portion 61 by solder joints 63. The input/output end of the transmission line 22 connects to the transmission terminal unit 23 through the circumventive wire. One end of the transmission line 22, namely the wire 62a, is circumvented to the output terminal 23a of the transmission terminal unit 23 through the circumventive portion 64 formed on the circumventive base 19b of the transmission side. The other end of the transmission line, namely the wire 62b, is connected to the common terminal 23b of the transmission terminal unit 23 through a shield layer 230 covering the surface of the circumventive base 19b of the transmission side. The circumventive portion 64 is for individual wiring, while the shield layer 230 is for common wiring. The circumventive wiring is constructed of these elements.

Figure 3:
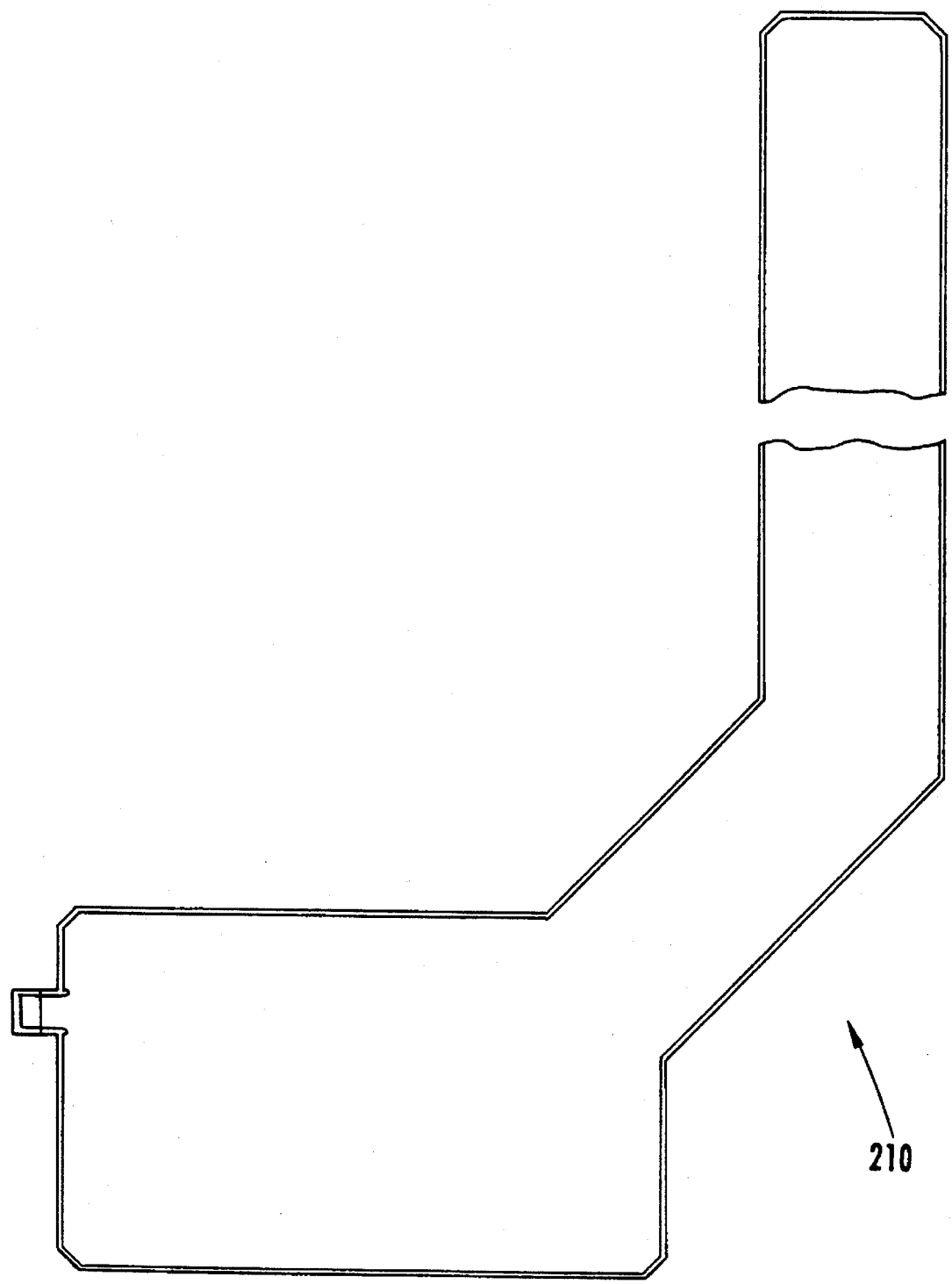
FIG. 3 is a front view showing the under shield layer of the circumventive wiring board of the transmission side.
Figure 4:
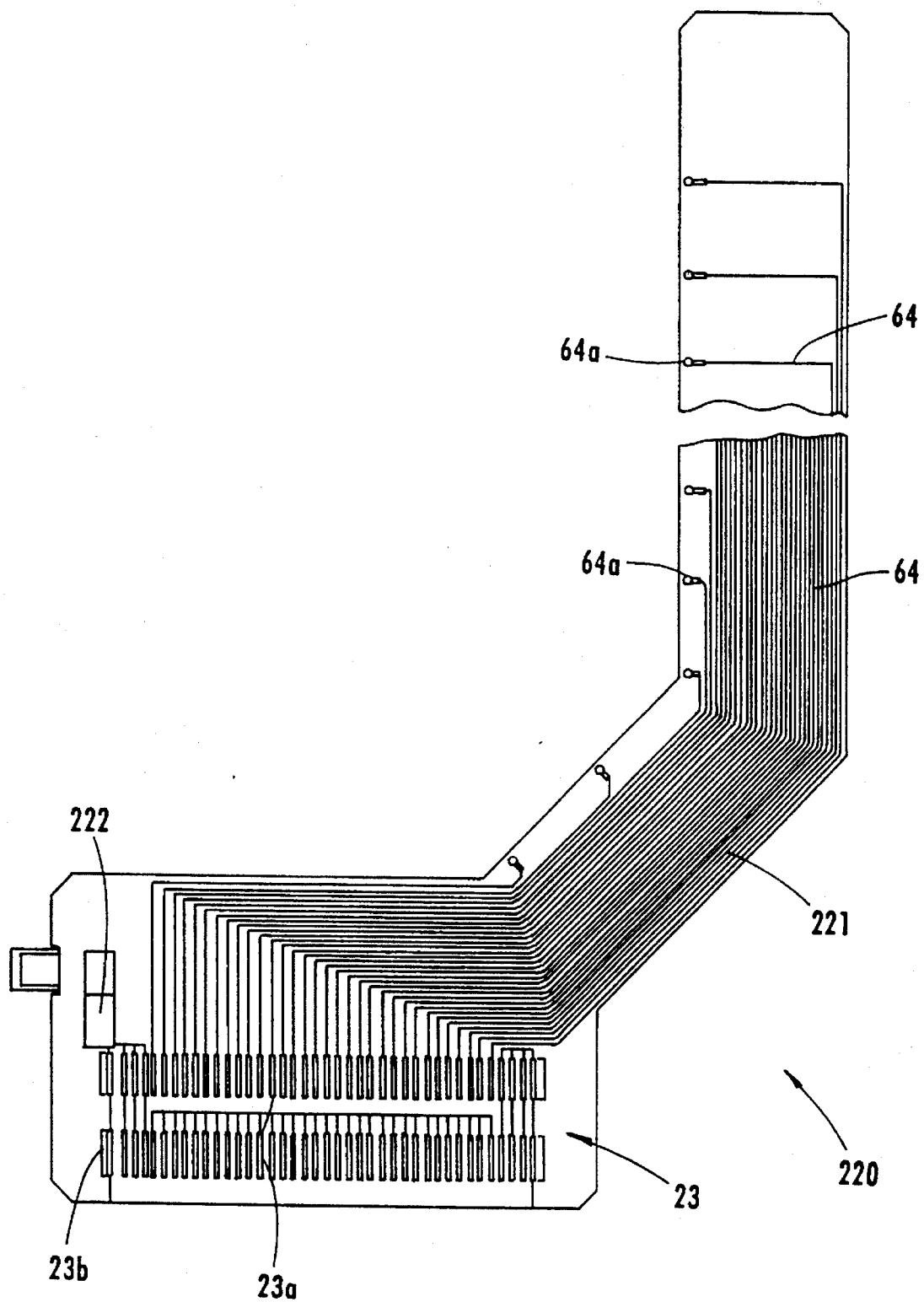
FIG. 4 is a front view showing the body of the circumventive wiring board of the transmission side.
Figure 5:
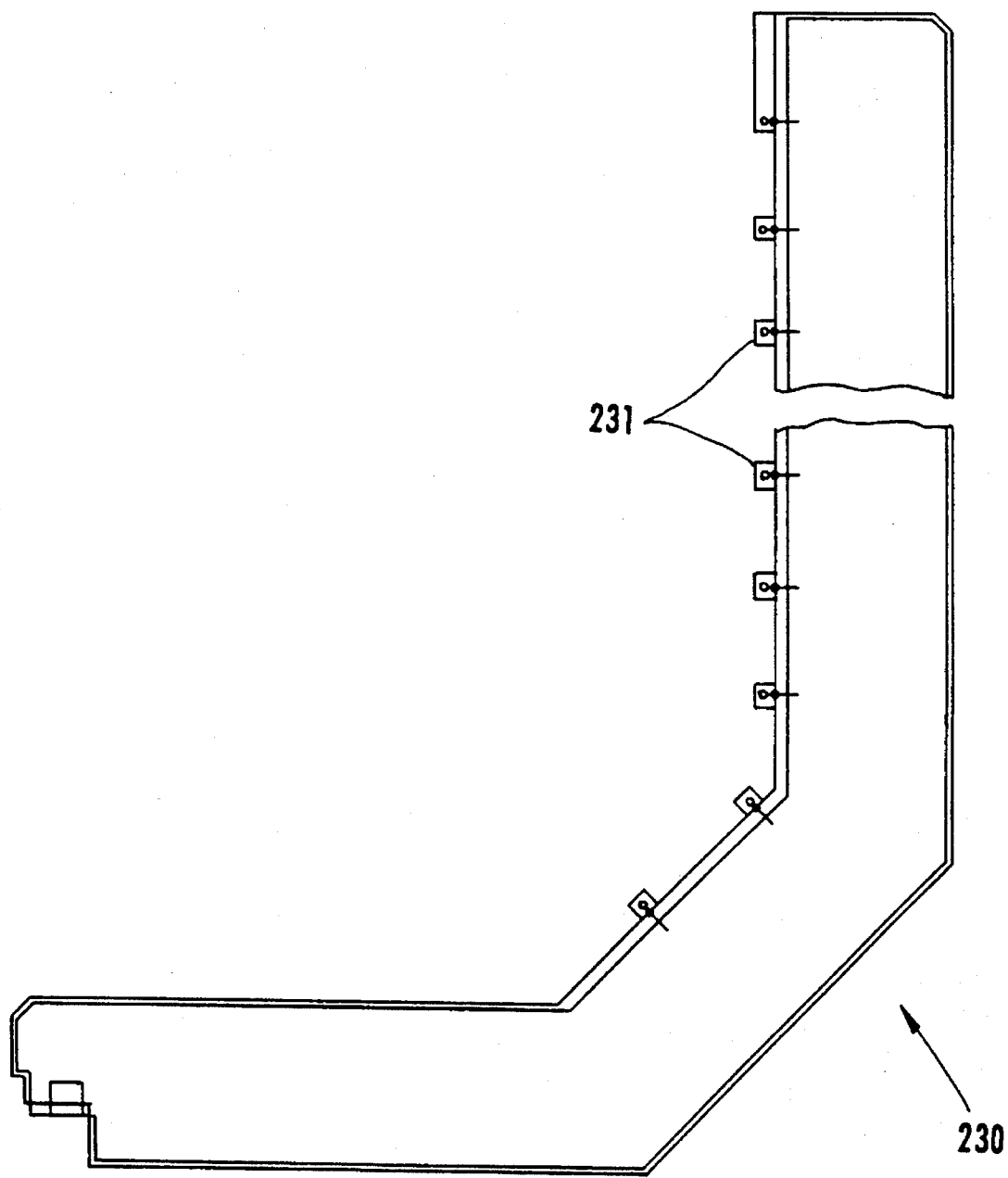
FIG. 5 is a front view showing the front side shield layer of the circumventive wiring board of the transmission side.

The circumventive base 19b of the transmission side is formed of an insulation board 220 shown in FIG. 4 being sandwiched between a front side shield layer 230 shown in FIG. 5, and an under shield layer shown in FIG. 3. Each of the layers is bonded to each other through an adhesive which forms an insulating layer. Due to this construction, the insulation board 220 is held between the two shield layers 210 and 230, thereby forming a laminated state. Here, each of the shield layers 210, and 230 is made of a conductive sheet. Incidentally, each of the shield layers 210 and 230 may be formed by laminating a conductive layer on an insulation sheet.

As shown in FIG. 4, on the surface of the insulation board 220, a conductor pattern 221 constructing the circumventive portion 64 and the transmission terminal unit 23, is formed. At one end of each circumventive portion 64, a connecting end portion 64a, being positioned corresponding to the wire 62a of the transmission line 22, is provided. At the other end of each circumventive portion 64, 32 of the output terminals 23a which form the transmission terminal unit 23, are provided. Incidentally, the transmission terminal unit 23 includes a common terminal 23b having a conductive piece 222 formed on the surface of the insulation board 220, so that it may be conductively connected to the shield layer 230.

Figure 2:
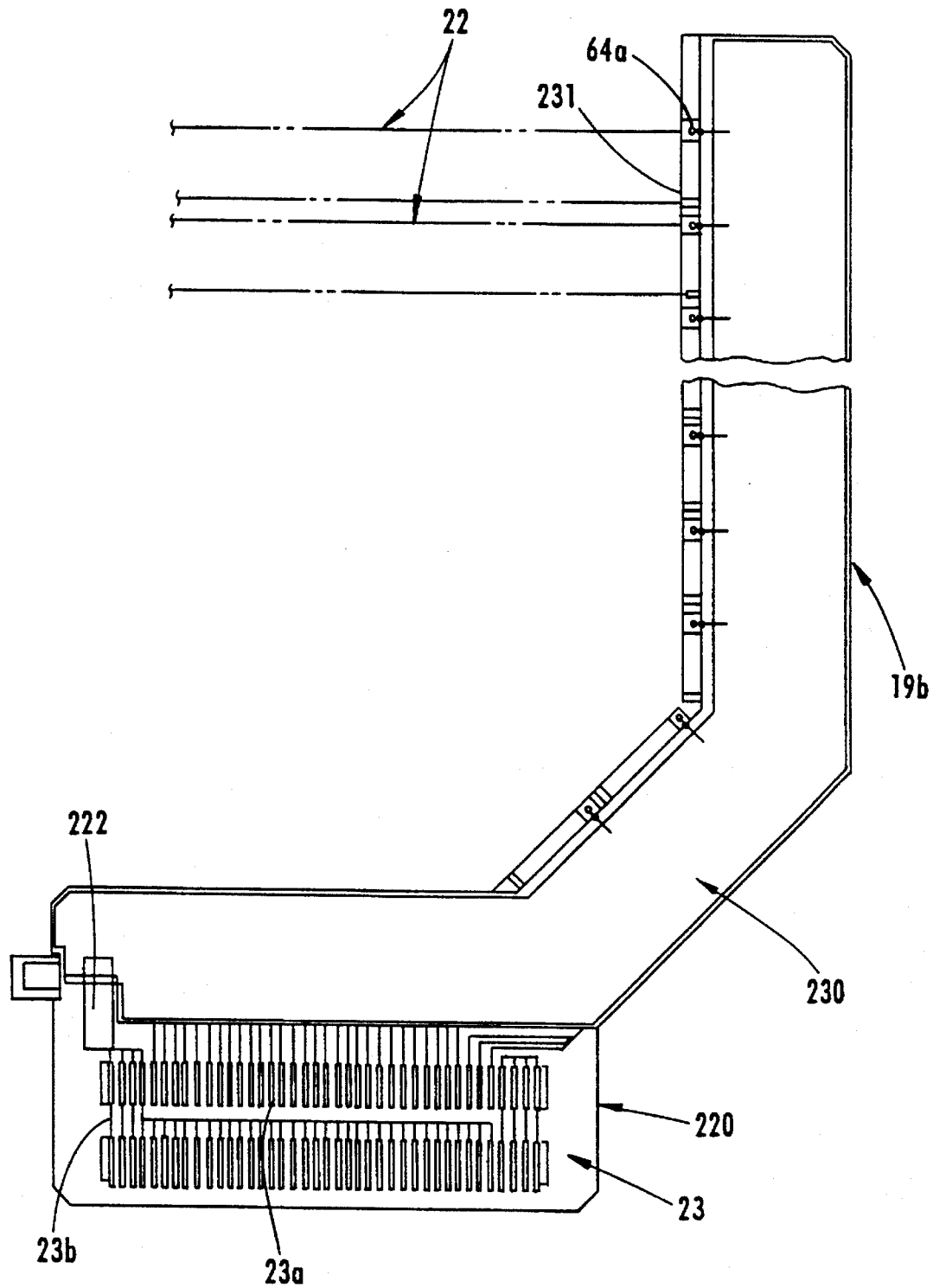
FIG. 2 is general front view showing the circumventive wiring board of the transmission side.

The front side layer 230 has a connecting portion 231 formed at the position corresponding to the other end of each transmission line 22. As shown in FIG. 2, the wire 64 in the other end of the transmission line 22 is soldered to the connecting portion 231, so that the other end portion of the transmission line is conductively connected to the shield layer 230, and further connected to the common terminal 23b as a whole, through the conductive piece 222. The output terminal 23a is respectively connected to outputs of 32 totem pole drivers 45 in a transmission circuit 40 which will be explained later, and the common terminal 23b is connected to the common side (COM) of the transmission circuit 40 (see FIG. 10).

On the other hand, as shown in FIG. 8, each of the reception lines 26 has a folding portion 61 formed on the folding base 29a, and wires 62a 62b connected to the folding portion 61 by soldering. The lower end portion thereof is connected to the reception terminal unit 27 through the circumventive portion 64 formed on a circumventive base 29b which is bonded to the lower end of the glass base on the other surface.

The reception terminal unit 27 also include an input terminal to be connected to a CT transformer 51 in a reception circuit 50 which will be mentioned later, and a common terminal to be connected to the common side (COM) of the reception circuit 50. Therefore both ends of the reception line 26 have to be connected to these terminals respectively. All the connections may be made through the circumventive portion 64, or as suggested for the transmission line 22, the common terminal side may be connected as a whole through the shield layer of the circumventive base 29b.

Each of the wires 62a, 62b is black, with a frosted surface, for prevention of the reflection of light so that these wires may not easily be seen by the game player.

A pattern for the sensing matrix suitable to a normal pachinko game machine 10, includes 32 columns of transmission lines 22, and 32 rows of reception lines 26 and total 1024 of detecting units 20a. The present embodiment illustrates this pattern having the 32 columns, and 32 rows of reception lines. In the illustration of FIG. 8, the patterns other than the outer side are omitted.

The size of the wire forming the transmission line 22 and the reception line 26 is desirably set between 25 μm–30 μm. In the present embodiment, as shown in FIG. 8, the general widths, c, and d, of the transmission terminal unit 23 and the reception terminal unit 27 are respectively 126 mm, and the widths, e and f, of the vertically extending portion of the transmission side folding base 19a and the transmission circumventive base 19b are respectively formed to be within 10 mm. Additionally, the width of each wire in the transmission terminal unit 23 and the reception terminal unit is 1.5 mm.

The sensing matrix 20 further includes a connector fixing board 66 provided at the lower end portion of the glass base 17a. The connector fixing board 66 holds the lower end of the glass base 17a therebetween from both sides, and is unitedly fixed to the inner glass element 17. The connector fixing board 66 is made of plastic or stainless steel and extends downward along the inner glass element 17 with the width thereof, and is located on the extended plane of the inner glass element 17 of the sensing matrix 20.

A transmission connector 67a and a reception connector 67b are fixed to the connector fixing board 66 at the position corresponding to the transmission terminal unit 23 and reception terminal unit 27 respectively, as shown in FIG. 5. Through these connectors, each terminal of the transmission terminal unit 23 and the reception terminal unit 27 is connected to the corresponding transmission circuit 40 and the reception circuit 50 respectively.

Besides, the connector fixing board 66 is so constructed that it is thickest at the position where the transmission connector 67a and the reception connector 67b are mounted. On the other hand, the transmission connector 67a and the reception connector 67b are short type, and the maximum thickness of the connector fixing board 66 is equal to or slightly smaller than the thickness of the inner glass element 17 of the sensing matrix 20.

On the side of a front glass element 16 of this connector fixing board 66, a transmission/reception board 171 (see FIG. 9), respectively connected to the transmission connecter 67a and to the reception connector 67b, is provided. The transmission/reception board 171 includes a transmission circuit 40 (see FIG. 10) for transmitting to the plurality of transmission lines 22 of the sensing matrix 20, and a reception circuit 50 (see FIG. 12) for receiving signals from the plurality of reception lines 26, and a junction connector (not illustrated) respectively connecting to the transmission connector 67a and the reception connector 67b.

The junction connector connects the transmission unit 23 to the transmission circuit 40, and the reception terminal unit 27 to the reception circuit 50 by being correspondingly connected to the transmission connector 67a and the reception connector 67a.

Next, the signal processing system for processing the signals of sensing matrix 20 will be explained.

As shown in FIG. 9, the sensing matrix 20 is controlled by the control board 172 which is provided apart form the sensing matrix 20, through the transmission/reception board 171. The control board 172 has an information processing device 30 (shown in FIG. 13), and is communicable through a communication line 179. The control board 172 further includes an interface unit 176 so that the information processing device 30 can read a monitor point from a card 173. The information processing device 30, however, not illustrated, includes at least a central processing unit (CPU) and a memory for storing programs and data therefor.

The card 173 is a memory card for monitor memory which readably stores the monitor point of the pachinko balls, and is removably attached to the interface unit 173. The card 173 stores therein the monitor data, such as winning holes 14a, 14a, provided on the panel 11 of the pachinko game machine 10, the detection position of the pachinko balls projected into the game region, data for the position of the discharge hole 15, and the detection algorithm of the pachinko balls which enter the winning holes 14a, 14a, and the discharge hole 15. As a memory to be installed in the card, RAM, mask ROM, EPROM, one-shot ROM or the like are employable.

The storage device 174 which is connected to the control board 172, is a device for recording the moving course of the pachinko balls moving within the space between the panel 11 and the inner glass element 17 of the pachinko game machine 10. The storage device 174, may be constructed, for example, of a hard disk type storage device. Data stored in the storage device 174 is processed in a computer 175 which is loaded with software for analyzing the moving course of the pachinko balls so that any necessary data for the pachinko game parlor is obtainable.

The transmission circuit 40 successively transmits a signal with a predetermined frequency to each transmission line 22. The reception circuit 50 successively receives a signal from each reception line 26 in synchronism with the transmission circuit 40. As a voltage waveform to be applied from the transmission circuit 40 to the transmission line, a continuous sine wave having the frequency of 1–1.13 MHz, which centers on 0 V, is suitable.

Figure 10:
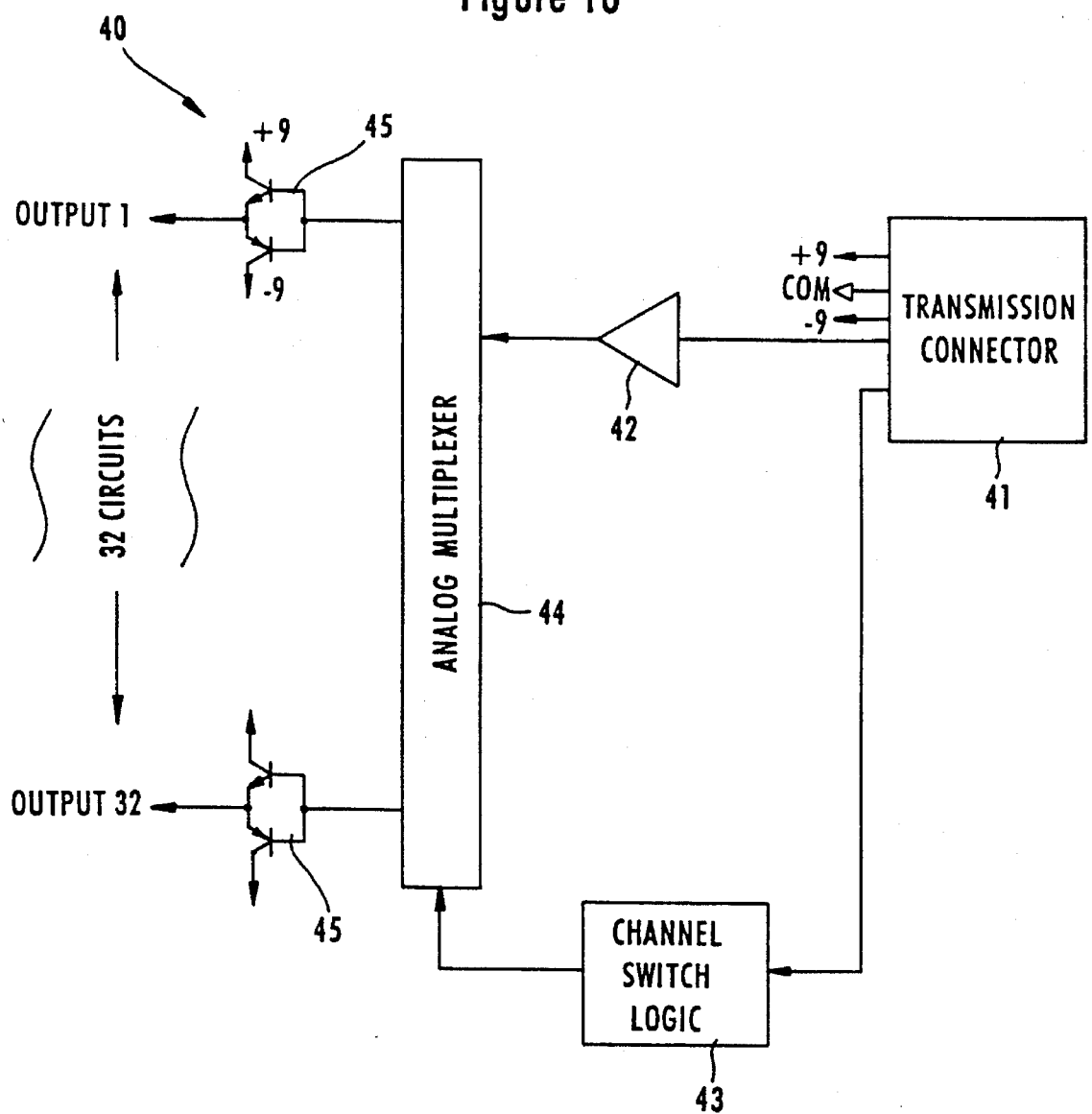
FIG. 10 is a block diagram showing the transmission circuit for a transmission/reception board.

As shown in FIG. 10, the transmission circuit 40 includes, a transmission connector 41, an amplifier 42 and a channel switching logic 43 connected to the transmission connector 41, an analog multiplexer 44 connected to the amplifier 43 and the channel switching logic 43, and 32 PNP+NPN totem pole drivers 45 connected to the analog multiplexer, and further respectively connected to each one end of the 32 circuits of the transmission lines 22 through the transmission connector 67a.

Figure 11:
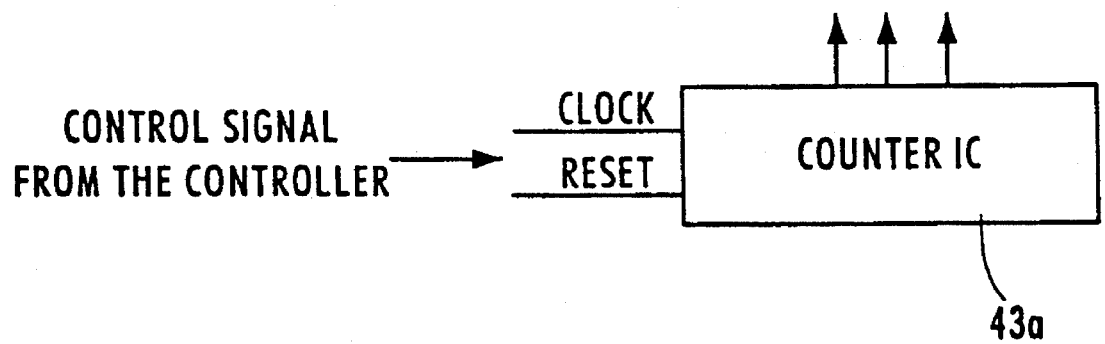
FIG. 11 is a block diagram showing the important elements of channel switching logic.

As shown in FIG. 11, the channel switching logic 43 has a counter IC 43a and operates under the control of the two control lines for clock and reset. To be more concrete, the connection status of the analog multiplexer 44 is successively switched over when one cycle of switching over of the analog multiplexer 44 is completed by a channel switching logic 54, which will be mentioned later. The channel switching logic 43 operates in synchronism with the channel switching logic 54.

Figure 12:
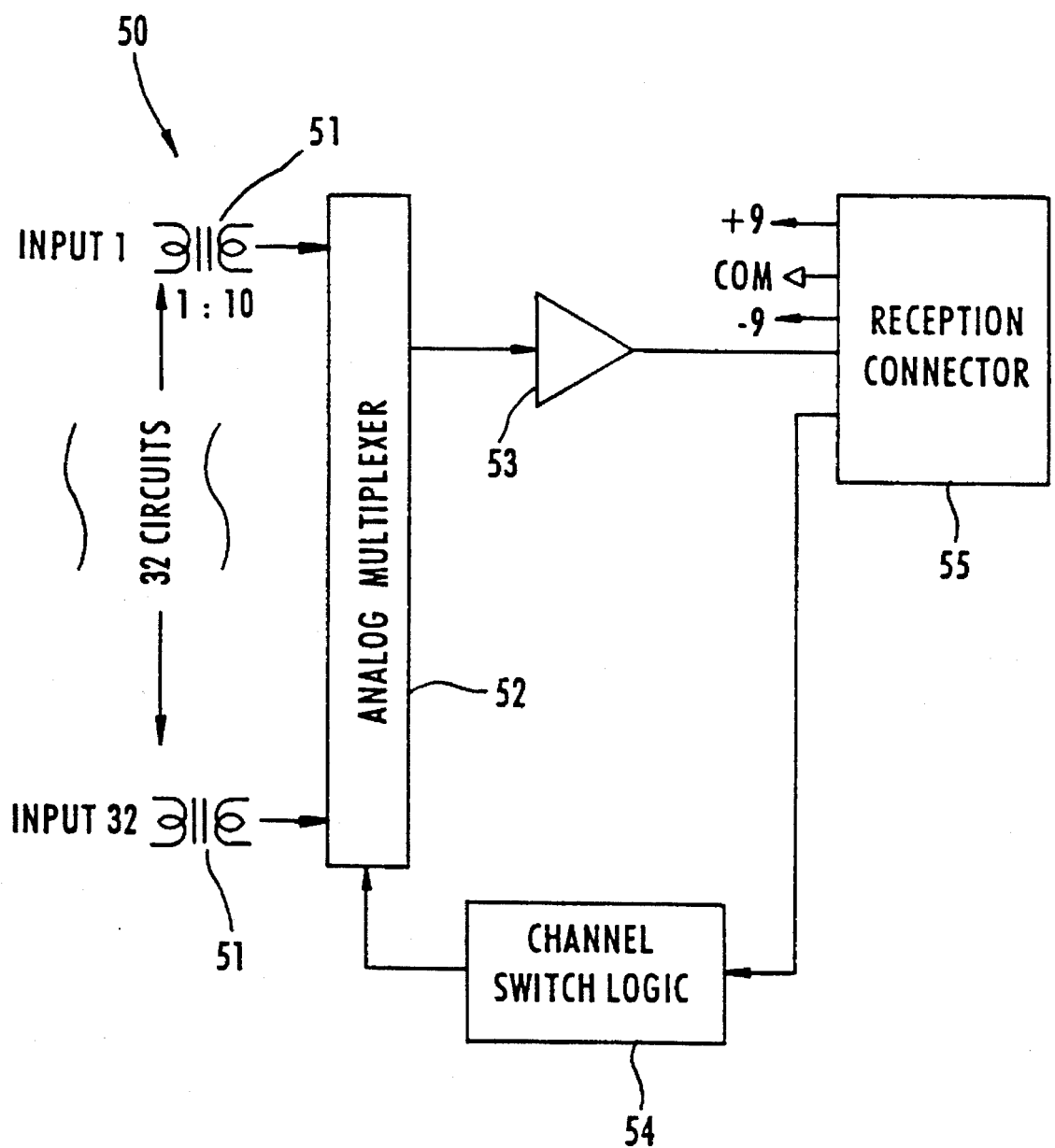
FIG. 12 is a block diagram showing the reception circuit for the transmission/reception board.

As shown in FIG. 12, the reception circuit 50 includes 32 CTs (current transformers) 51 respectively connected to the 32 circuits of the reception lines 26, an analog multiplexer 52 connected to the CTs 51, an amplifier 53 and a channel switching logic 54 connected to the analog multiplexer 52, and a reception connector 55 connected to the amplifier 53 and the channel switching logic 54. Accordingly, the reception circuit 50 receives a signal from each of the reception lines through each CT 51.

The CT 51 insulates each reception line 26 from the analog multiplexer 52 while amplifying the signal current from each reception line by ten times. The analog multiplexer 52 successively receives a signal from each CT 51 based on the instructions from the channel switching logic 54. The amplifier 53 amplifies the signal from the analog multiplexer 52.

The channel switching logic 54 is the same element as the channel switching logic 43 in the transmission circuit 40. In this case, the input switching status of the analog multiplexer 52 is changed by each cycle of the scanning based on a clock signal output from a sequence control circuit 47.

Figure 13:
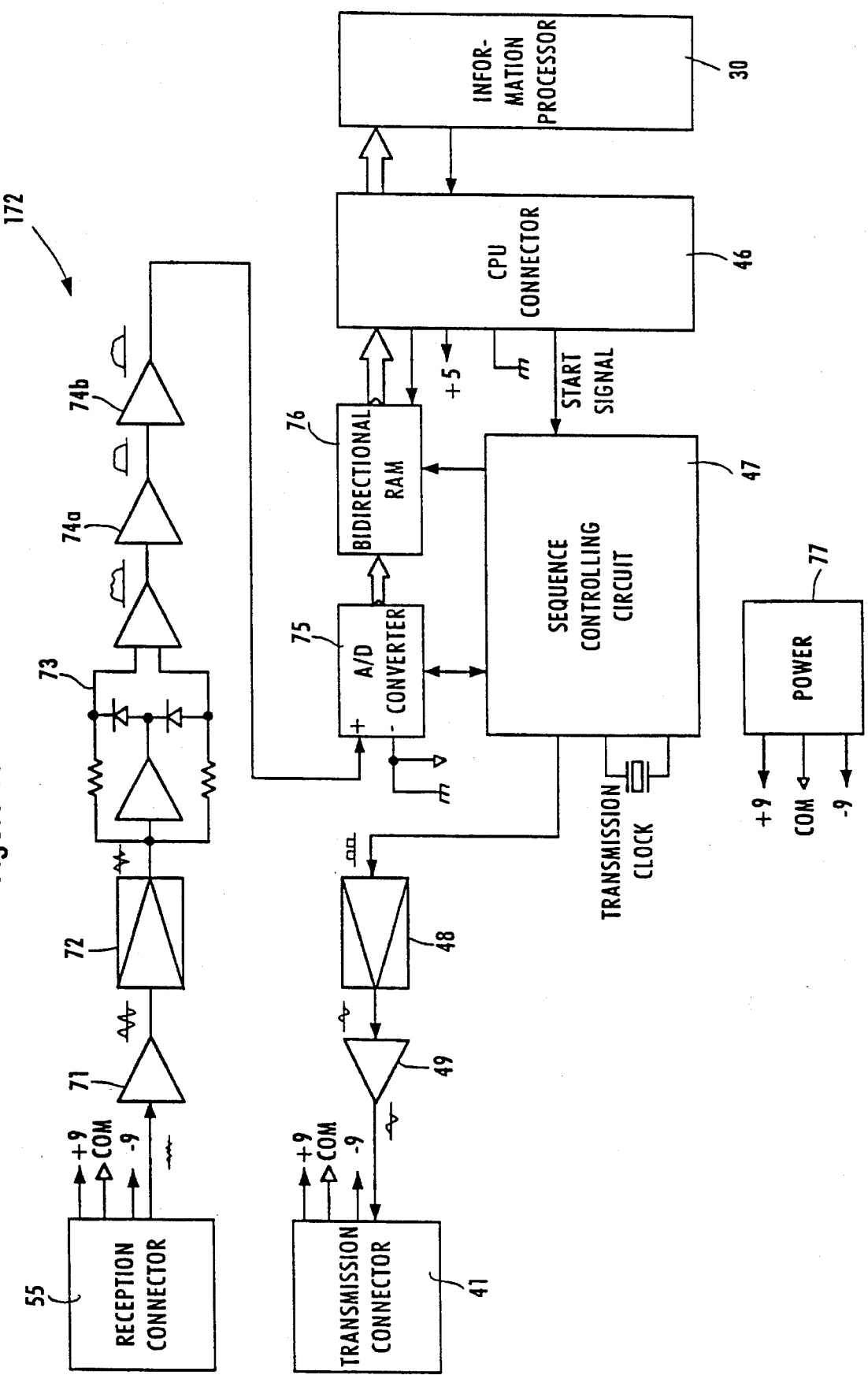
FIG. 13 is a block diagram showing the reception and transmission circuit for the control board.

As shown in FIG. 13, the control board 172 has the information processing device 30, and in the transmission side thereof, the sequence control circuit 47 for sending a transmission clock in response to the start signal input from the information processing device 30 through a CPU connector 46, a band-pass filter 48 which receives the transmission clock to output transmission signal, and an amplifier 49 for amplifying the transmission signal to send it to the transmission connector 41.

Further in the reception side of the control board 172, there is provided an amplifier 71 for amplifying the reception signal from the reception connector 55, a band-pass filter 72 for receiving the amplified signal, a full wave rectifier/amplifier 73 for receiving the reception signal from the band-pass filter 72, two-stage low-pass filters 74a, 74b for receiving the reception signal from the full wave rectifier/amplifier 73, an A/D converter 75 for receiving the reception signal from the low-pass filter 74b, and converting the reception signal into a digital signal to output under the control of the sequence control circuit 47, a bidirectional RAM 76 for writing the digital data thereinto under the control of the sequence control circuit 47, and transmitting the data to the information processing device 30 through the CPU connector 46 in response to the read signal from the CPU connector 46.

Besides, the control board 172 has a power unit 77. The capacity of the bidirectional RAM 76 is, for example, 2048 byte.

The information processing device 30 reads the response data Z of the bidirectional RAM 76 as well as the monitor region data in the card 173, so that the pachinko ball is monitored by corresponding the response data Z to the monitor region data of the pachinko balls.

Next, the operation of the embodiment according to the present invention will be explained.

Figure 14:
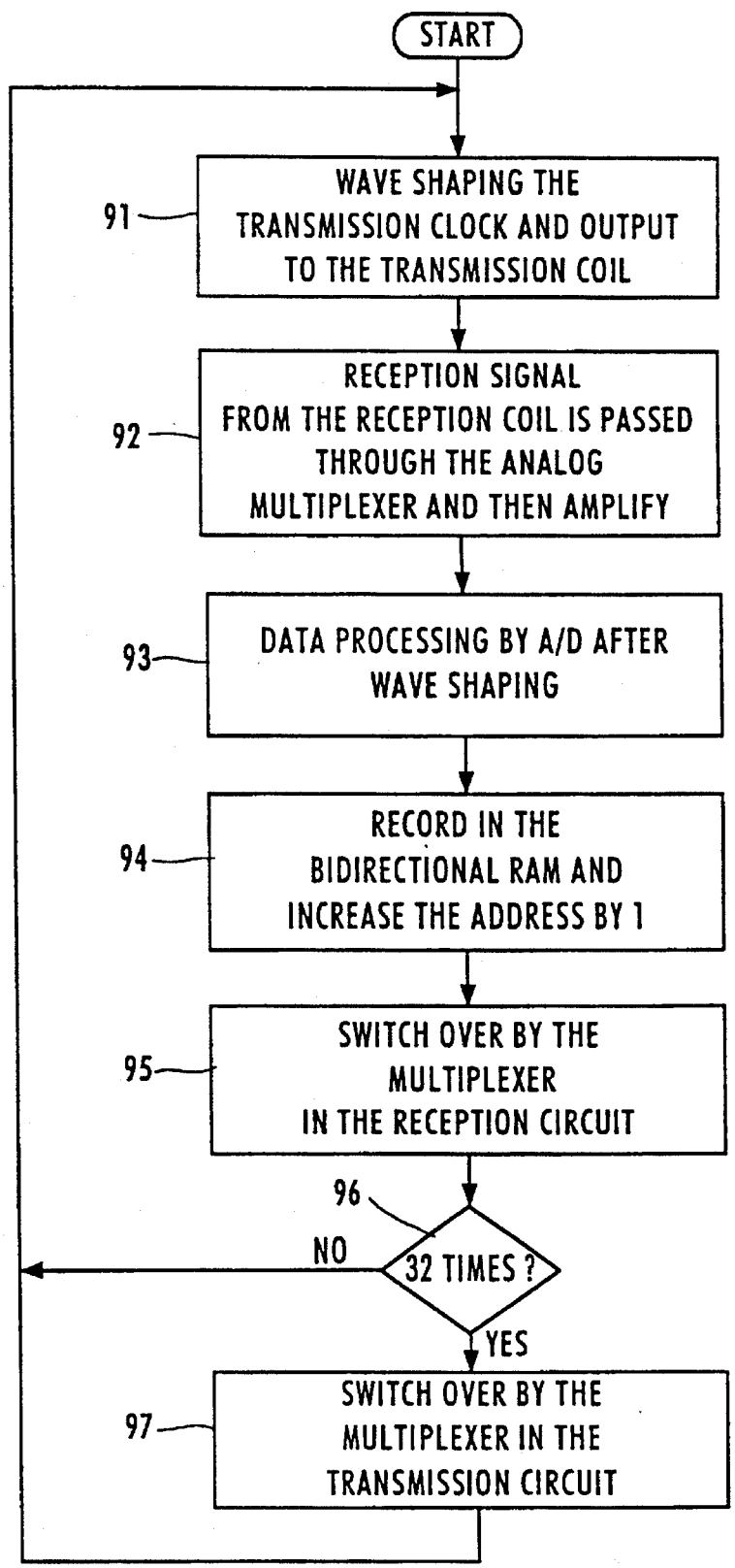
FIG. 14 is a flow chart showing the scanning process of the sensing matrix.

An address signal and a control signal from the information processing device 30 is output through the CPU connector 64. The processing flow is shown in FIG. 14.

When a start signal is output from the information processing device 30 to the sequence control circuit 47, the reference clock of 16 MHz is demultiplexed into an appropriate clock frequency to generate a transmission clock to be output. The transmission clock output from the sequence control circuit 47 is subjected to waveform shaping to be changed from a digital signal to an analog signal by the band-pass filter 48. Then the analog signal is amplified by the amplifier 49, and transmitted to the transmission connector 41.

The transmission signal is further amplified by the amplifier 42 in the transmission circuit 40. The analog multiplexer 44 successively operates each of the totem pole drivers 45 by the channel which is switched by the channel switching logic 43. Accordingly, the totem pole driver 45 successively outputs a signal amplified by the amplifier 42 (Step 91).

Thereupon, an electromotive force is generated by the electromagnetic induction action in each reception line crossing the transmission line through which the signal is transmitted. When a pachinko ball, which is a metal material, approaches a detecting unit 20a, an eddy current is generated in the pachinko ball in the direction cancelling the magnetic flux caused by the transmission line 22. Due to the effect of the eddy current, the strength of the electromotive force of the reception line 26 (an induction current) at the detecting unit 20 changes.

At the reception side, the reception circuit 50 is synchronized with the transmission circuit 40 through the sequence control circuit 47, and receives a signal from each of the reception lines through each CT 51. As shown in FIG. 12, the induction currents generated in each of the plurality of reception lines 26 is increased by 10 times by the CT 51. For the conversion by the CT 51, the degree of amplification required for the amplifier in the reception side is reduced. The CT 51 acts to insulate the reception lines 26 of the sensing matrix 20 constructing the metal sensor, from the analog multiplexer 52 in the reception circuit 50 in order to prevent any noise from entering into the reception circuit 50 from the pachinko game machine 10.

The analog multiplexer 52 switches over the signal obtained from each reception line via CT 51 by the channel switching logic 54, and successively outputs the signal. The output signal from the analog multiplexer 52 is amplified by 100 times by the amplifier 53 (Step 92).

The reception signal is transmitted via the reception connecter 55, the amplifier 71 and the band-pass filter 72, then amplification and detection of the waveform is conducted. The reception signal is output from the band-pass filter 72 in the form of an analog signal, and the analog signal is subjected to wave shaping by the full wave rectifier/amplifier 73. The signal from the full wave rectifier/amplifier 73 is averaged in an integrating process by the low-pass filters 74a, 74b.

Next, the reception signal is transmitted to the A/D converter 75. The A/D converter 75 converts a signal from the reception line 26 into a digital signal with a predetermined bit unit, such as 12 bits or the like, and through the control of the sequence control circuit 47, the converted signal (detecting data) is output to be registered in the bidirectional RAM 76(Step 93).

The bidirectional RAM 76 records the detecting data based on the write signal from the sequence control circuit 47, regardless of the operation of the information processing device 30, then increases the address by one for each scanning cycle based on the clock signal output from the sequence control circuit 47 (for example, by each one clock) so that the detecting data is registered at a different address for each detection unit 20a.

The above mentioned operation is repeated by each scanning cycle. Namely, by each scanning cycle, the analog multiplexer 52 of the reception circuit 50 switches over the signal from each reception line 26 (step 95). This operation is repeated 32 times, namely with respect to the 32 reception lines 26. When this operation is completed (step 96), the analog multiplexer 44 in the transmission circuit 40 switches over the transmission line 22 (see step 97), and the same process is then repeated 32 times, so that the detecting data of each detecting unit 20a are successively registered in the different addresses of the bidirectional RAM 76 corresponding to the detection unit 20a.

Accordingly, the information processing device 30 can determine when and where the pachinko ball was present at any time with an optional detecting requirement independent of the operation of the above mentioned detection signal processing operation, just by reading the detection data registered in the bidirectional RAM 76.

Therefore the information processing device 30, can, if required, read the detection data registered in the bidirectional RAM 76 based on the read start signal, and process the operation, and monitor the pachinko balls by relating the detecting data to the monitoring data of the pachinko balls stored in the card 173.

Additionally, in the sensing matrix according to the embodiment of the present invention, the other end of each of the transmission lines 22 to be connected to the the common side, is respectively connected to one of the shield layers which sandwich the circumventive portion 64, and the further connected to the common terminals of the transmission terminal unit 23 through the shield layer as a whole. Therefore, the number of lines in the circumventive portion 64 is equal to the number of transmission lines, (in this case 32), so the number of lines is reduced by half compared with the prior art (64 lines). In the same manner, the other end of each reception line 26 is respectively connected to one of the shield layers which sandwich the circumventive portion 64, and further connected to the common terminal of the reception terminal unit 27 through the shield layer as a whole. Therefore, the number of lines in the circumventive portion 64 is equal to the number of reception lines 26 (in this case 32), so the number of the lines is reduced by half compared with the prior art (64 lines).

Therefore if the conventional line width is kept for the circumventive portion 64, the wiring area of the circumventive portion 64 (the size of the circumventive circuit board) can be remarkably reduced so that the detecting portion of the metal sensor (sensing matrix 20) may be downsized, or the cost of production may be reduced.

Even if the size of the wiring area of the circumventive portion 64 is maintained or only slightly reduced, the line width of the circumventive portion 64 can be remarkably increased. For example, as the insulation width is reduced by half, the line width may be not only doubled but tripled in maximum. Therefore, the amount of transmission current can be increased to improve the detecting sensitivity (noise resistance).

Now the result of the experiments showing the effect in improvement of the detecting sensitivity (noise resistance) will be explained referring to the graphs shown in FIGS. 15 and 16.

In the graphs shown in FIGS. 15 and 16, indicates the abscissa axis the difference of the output value of the A/D converter between the cases when a pachinko ball is present at the detection position and when no pachinko ball is present at the detection position, and the ordinate axis indicates the distance between the pachinko ball and the sensing matrix 20 (the height of the pachinko ball). The data is shown for the detection positions where the 16th transmission line 22 are crossing the 2nd, 9th, 16th, 23rd 30th reception lines (shown as RX 2–30 in the drawings).

First, FIG. 16 shows the data for a sensing matrix having twice as many circumventive wires as transmission lines (the line width of the transmission wire in the circumventive portion is 0.125 mm). In this case, as the pachinko ball goes higher, almost all the detection positions fall within the undetectable region which is shown in the dotted lines in the drawing. Especially, the second reception line RX2 falls within the undetectable region when the pachinko ball goes even slightly high. Incidentally, the undetectable region is the region with a very small value where the change of the output value of the A/D converter appears even when no pachinko ball exists, because of noise or signal ripple.

On the other hand, FIG. 15 shows the case when the sensing matrix according to the present invention (the line width of the transmission line in the circumventive portion is 0.35 mm) is employed and the same transmission voltage as used in the experiment of FIG. 16 is applied thereto. As the electrical resistance is reduced and the current is increased, almost all the detection positions are out of the undetectable region even the pachinko ball goes higher. As to the second transmission line RX2, it does not fall into the undetectable region until the pachinko ball goes very high. Accordingly, the performance is improved remarkably.

Besides, in the above mentioned embodiment, it is suggested by way of example, that the common side is connected through the front shield layer 230 of the circumventive wiring board as a whole, however, the common side may be connected through the under shield layer 210 instead.

In the sensing matrix according to the present invention, the number of lines in the circumventive portion for connecting the transmission lines to the transmission terminal unit, and for connecting the reception lines to the reception terminal unit, is reduced by half of the conventional type. Therefor, if the same line width is maintained in the circumventive portion as in the conventional type, the wiring area of the circumventive portion can be greatly reduced, thereby downsizing or reduction of the production cost for a metal sensor can be realized.

Even if the wiring area of the circumventive portion is maintained as before or only slightly reduced, the line width in the circumventive portion can be greatly enlarged. Therefore the transmission current can be increased to improve the detection sensitivity (noise resistance).

We claim:

1. A metal body detecting apparatus comprising;
    a sensing matrix assembly having a planar detecting area;
    a signal processing system for detecting the presence of the metal body and location thereof by driving said sensing matrix assembly;
    said sensing matrix assembly having a plurality of transmission lines arranged in parallel and a plurality of reception lines arranged in parallel and a wiring board for supporting said lines,
    said plurality of transmission lines arranged in parallel and said plurality of transmission lines arranged in parallel crossing each other so that the crossing portions thereof are arranged in a matrix on said wiring board;

said signal processing system comprising;

a transmission circuit for successively scanning said plurality of transmission lines to send a transmission signal thereto, a reception circuit for successively scanning said plurality of reception lines to obtain a reception signal applied thereto, a signal processing device for determining whether a metal body is present or not based on the obtained signal through said reception circuit, and for determining the location where the metal body is detected, based on information indicative of the transmission line scanning position in said transmission circuit, and information indicative of the reception line scanning position in said reception circuit, said transmission lines and said reception lines, each having a pair of lead wires formed of an outward path and a return path being parallel with each other, said outward path and said return path in each pair of wires being connected with each other at one end thereof, and the other end side being adapted to be an input and an output end of a signal, said wiring board comprising:

a transmission terminal unit for connecting to said transmission circuit, a reception terminal unit for connecting to said reception circuit, a wiring area on which said transmission lines and said reception lines are arranged, a circumventive wiring board for transmission lines for providing circumventive wiring for said transmission lines for connecting said input/output ends of the transmission lines to said transmission terminal unit, a circumventive wiring board for reception lines for providing circumventive wiring for said reception lines for connecting the input/output ends of the reception lines to said reception terminal unit, said circumventive wiring board for said transmission lines, and said cricumventive wiring board for said reception lines being provided out of said wiring area, and at least one of said circumventive wiring board for said transmission lines and said circumventive wiring board for said reception lines comprising;

individual wiring provided for only one of the input or output ends of said outward path and said return path in each pair of wirings, common wiring provided for the other end, an insulation board, and a pair of shield layers laminated on both sides of said insulation board through an insulation, said individual wiring being provided on said insulation board and a part of said common wiring being formed of said shield layer.

2. A metal body detecting apparatus according to claim 1, wherein said shield layer is made of a conductor sheet and is bonded to said circumventive wiring board through an adhesive which forms an insulating layer.

3. A metal body detecting apparatus according to claim 2, wherein one of the input/output ends of said pair of lead wires is connected to said individual wiring, and the other end is connected to said shield layers respectively.

4. A metal body detecting apparatus according to claim 3, wherein said transmission terminal unit and said reception terminal unit are juxtaposed on a side of said wiring board, and at least one of said circumventive wiring boards connects the input/output ends of the lead wires which are arranged in parallel to said side of said wiring board, to one of said transmission terminal unit and reception terminal unit.

5. A sensing matrix assembly for detecting a metal body having a plurality of transmission lines arranged in parallel, a plurality of reception lines arranged in parallel, and a wiring board for supporting said lines, said plurality of transmission lines being arranged in parallel and said plurality of reception lines being arranged in parallel crossing each other so that the crossing portions thereof are arranged in a matrix on said wiring board, and when a transmission signal is fed to the transmission lines by an external drive circuit, the reception lines crossing therewith outputting an induction current;

each of said transmission lines and reception lines consisting of a pair of lead wires forming an outward path and a return path in parallel to each other, said outward path and said return path in each pair of wires being connected with each other at one end thereof, and the other end being adapted to be an input/output end of a signal, said wiring board comprising:

a transmission terminal unit for connecting to said external drive circuit, a reception terminal unit for connecting to said external drive circuit, an wiring area on which said transmission lines and said reception lines are arranged, a circumventive wiring board for said transmission lines for providing circumventive wiring for connecting the input/output ends of the transmission lines to said transmission terminal unit, a circumventive wiring board for providing circumventive wiring for said reception lines for connecting the input/output ends of the reception lines to said reception terminal, said circumventive wirings being formed out of said wiring area, at least one of said circumventive wiring board for said transmission lines and said circumventive wiring board for said reception lines comprising;

individual wiring provided for only one of the input or output ends of said outward path and said return path in each pair of wirings, common wiring provided for the other end, an insulation board, and a pair of shield layers laminated on both sides of said insulation board through an insulation, said individual wiring being provided on said insulation board and a part of said common wiring being formed of said shield layer.

6. A sensing matrix according to claim 5, wherein said shield layer is made of a conductor sheet and is bonded to said circumventive wiring board through an adhesive which forms an insulating layer.

7. A sensing matrix according to claim 6, wherein one of the input/output ends of said pair of lead wires is connected to said individual wiring, and the other end is connected to said shield layers respectively.

8. A sensing matrix according to claim 7, wherein said transmission terminal unit and said reception terminal unit are juxtaposed on a side of said wiring board, and at least one of said circumventive wiring boards connects the input/output ends of the lead wires which are arranged in parallel to said side of said wiring board, to one of said transmission terminal unit and reception terminal unit.

9. A sensing matrix according to claim 8, further comprising:

- a folding base for turning a lead wire and connecting one end of each pair of lead wires formed of an outward path and a return path,
- wherein said folding base comprising a folding portion which connects the outward path and return path of each pair of lead wires and transmits a signal from the outward path to the return path.

10. A sensing matrix according to claim 5, wherein said transmission lines and reception lines are arranged to cross each other forming a right angle.

11. A sensing matrix according to claim 10, wherein said transmission terminal unit and said reception terminal unit are placed side by side at an edge of said wiring board in a longitudinal direction of either the transmission lines or the reception lines.

12. A sensing matrix according to claim 11, wherein said common wiring is provided for the transmission lines and the reception lines, at least in a direction where its longitudinal direction is perpendicularly crossing the direction in which the transmission terminal unit and the reception terminal unit are disposed.

13. A sensing matrix according to claim 12, wherein said transmission terminal unit and said reception terminal unit are disposed on a different surface of the wiring board.

* * * * *